United States Patent
Nguyen et al.

(10) Patent No.: US 11,692,125 B2
(45) Date of Patent: Jul. 4, 2023

(54) INJECTION FLUIDS COMPRISING ANIONIC SURFACTANTS AND ALKOXYLATED ALCOHOLS AND THE USE OF SUCH FLUIDS IN CHEMICAL ENHANCED OIL RECOVERY PROCESSES

(71) Applicant: Sasol Chemicals GmbH, Hamburg (DE)

(72) Inventors: Thu Nguyen, Westlake, LA (US); Carla A. Morgan, Westlake, LA (US); Jorge Fernandez, Westlake, LA (US)

(*) Notice: Subject to any disclaimer, the term of this patent is extended or adjusted under 35 U.S.C. 154(b) by 125 days.

(21) Appl. No.: 17/607,618

(22) PCT Filed: May 1, 2020

(86) PCT No.: PCT/US2020/030932
§ 371 (c)(1),
(2) Date: Oct. 29, 2021

(87) PCT Pub. No.: WO2020/227052
PCT Pub. Date: Nov. 12, 2020

(65) Prior Publication Data
US 2022/0204835 A1 Jun. 30, 2022

Related U.S. Application Data

(60) Provisional application No. 62/842,663, filed on May 3, 2019.

(51) Int. Cl.
*E21B 43/34* (2006.01)
*C09K 8/584* (2006.01)

(52) U.S. Cl.
CPC .................. *C09K 8/584* (2013.01)

(58) Field of Classification Search
CPC .................. C09K 8/584; E21B 43/34
(Continued)

(56) References Cited

U.S. PATENT DOCUMENTS 4,516,635 A * 5/1985 Maddox, Jr. ........... C09K 8/584
166/266
7,902,124 B2 * 3/2011 Ali ............................ C11D 1/90
166/305.1
(Continued)

FOREIGN PATENT DOCUMENTS

WO 2012/158645 11/2012
WO 2016/040750 3/2016

*Primary Examiner* — William D Hutton, Jr.
*Assistant Examiner* — Ashish K Varma
(74) *Attorney, Agent, or Firm* — Bushman Werner, P.C.

(57) ABSTRACT

A method for using a surfactant formulation in chemical enhanced oil recovery, wherein said surfactant formulation comprises at least: (i) an anionic salt of an alkyl alkoxylated sulfate, wherein said alkyl alkoxylated sulfate has a molecular structure as shown in (I), wherein R is a linear, branched or mixture of linear and branched alkyl group having from 10 to 20 carbon atoms, n=4 –15, m=0-10, M+ is an alkali metal ion, an alkanolamine ion, an alkyl amine ion or an ammonium ion; and (ii) a non-ionic alcohol O ethoxylate, wherein said alcohol ethoxylate has a molecular structure as shown in (II), wherein $R_1$ is a linear, branched or mixture of linear and branched alkyl group having from 8 to 24 carbon atoms, y=20-100.

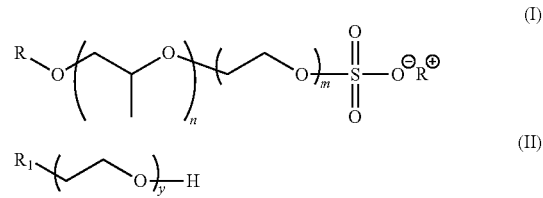

22 Claims, 9 Drawing Sheets

(58) Field of Classification Search
USPC .......................................................... 166/307
See application file for complete search history.

(56) References Cited

U.S. PATENT DOCUMENTS

| | | | |
|---|---|---|---|
| 2006/0131017 A1* | 6/2006 | Garcia-Lopez De Victoria ......... | C09K 8/74 507/933 |
| 2011/0083847 A1* | 4/2011 | Bittner ................... | C09K 8/584 166/270.1 |
| 2015/0368550 A1* | 12/2015 | Jakobs-Sauter ......... | C08L 71/02 507/240 |

* cited by examiner

INJECTION FLUIDS COMPRISING ANIONIC SURFACTANTS AND ALKOXYLATED ALCOHOLS AND THE USE OF SUCH FLUIDS IN CHEMICAL ENHANCED OIL RECOVERY PROCESSES

The present invention relates to surfactant formulations comprising anionic surfactants together with non-ionic surfactants and the use of such formulations in chemical enhanced oil recovery processes. More specifically, the surfactant formulation relates to blends of anionic salts of alkyl alkoxylated sulfates and non-ionic alcohol ethoxylates, for the reduction of the interfacial tension for a broad range of crude oils with various compositions and densities during chemical enhanced oil recovery processes, over wide temperature and salinity ranges. The invention further relates to a chemical enhanced oil recovery process injecting blends of salts of alkyl alkoxylated sulfates and alcohol ethoxylates.

BACKGROUND OF THE INVENTION AND DISCUSSION OF THE PRIOR ART

Various methods for oil recovery from subterranean surfaces have been developed over the past decades. The challenges experienced with chemical enhanced oil recovery (EOR) techniques applied in high temperature/high salinity reservoirs, typically using surfactant formulations, are often associated with the aqueous instability of the solutions. At high temperature and/or high salinity conditions, the surfactant formulations tend to phase separate or precipitate, leading to lower oil recovery. Co-surfactants and/or co-solvents can be used to resolve the aqueous instability. However, adding co-surfactants and/or co-solvents can also compromise the ability of the main surfactant to reduce the oil/water interfacial tension (IFT) to ultralow values—an essential requirement for effective oil mobilization and therefore, oil recovery.

A number of past studies have evaluated various surfactant systems for application in high temperature and/or high salinity reservoirs. Puerto et al. (2012) evaluated blends of an alkoxylate glycidyl sulfonate and an internal olefin sulfonate (IOS) at temperatures up to 120° C. and salinity up to 21% NaCl, without the presence of divalent cations (such as $Ca^{2+}$, $Mg^{2+}$ etc.) in the water. The total surfactant concentration was however unfortunately high at 2 wt %, and no crude oil was used to confirm results. Instead, middle phase microemulsions were observed with octane as the model oil, without any IFT value reported. The surfactants evaluated (alkoxylate glycidyl sulfonates) were not available as commercial products and would be more expensive to manufacture than corresponding sulfates or IOS.

In another study by Chou and Bae (1988), surfactant formulations for high salinity, up to 21%, were discussed. The brine used was however only composed of NaCl, with no divalent cations present. No crude oil but instead alkane oils (C6 to C16) were evaluated. Other works (Han et al., 2013; Ghosh and Obassi, 2013; Jabbar et al., 2017) identified surfactant systems that have aqueous stability with or without ultralow IFT values reported at high temperature and/or salinity. However, these studies were only done on one specific crude oil or alkane oils. None of these studies evaluated and identified an aqueous-stable surfactant system that produces ultralow IFT for a range of crude oils having various saturate, aromatic, resin and asphaltene (SARA) compositions and densities over a range of salinities and temperatures.

Prior art searches failed to identify a single phase-stable formulation that can produce ultralow IFT for a range of crude oils of various compositions and properties over a wide temperature and salinity range (see U.S. Pat. No. 4,479,894; US 2009/0111717 A1; U.S. Pat. No. 4,293,428; US 2011/0059873 A1; U.S. Pat. Nos. 4,269,271; 5,358,045; and 4,077,471).

Baker Hughes' U.S. Pat. No. 9,828,815 B2 describes foam fluids for high salinity conditions using surfactant blends of anionic surfactants, sulfates or sulfonates, with non-ionic surfactants as one type of co-surfactant. Even though the patent claims that such fluids are capable of generating an IFT of $10^{-1}$-$10^{-3}$ mN/m for a variety of applications, including enhance oil recovery, the patent provides no experimental evidence or examples for such claims. The IFT range was mentioned without any indication of oil type or properties. Formulations used for examples are not described, and experimental results are only applicable to gas lift operations.

US2011/0083847A1 also describes mixtures of surfactants for tertiary mineral oil production, but sought-after ultra-low interfacial tension values over a wide range of salinities are not obtained.

All prior art patents, patent publications, and non-patent literature listed in this application are incorporated herein by reference for all purposes.

OBJECT OF THE PRESENT INVENTION

The advantages of the inventive formulations described include their usage at low total surfactant concentrations of 0.5 wt % and lower in brine solutions, over a range of salinities of up to 15% (150,000 ppm) total dissolved solids (TDS) including up to 1% divalent cations (10,000 ppm), and temperatures up to 70° C. The formulations produce ultralow IFT values at and below $10^{-2}$ mN/m, for a range of heavy and light crude oils with various properties (SARA compositions and densities).

SUMMARY OF THE INVENTION

The present invention relates to a formulation of a specific group of anionic surfactants, combined with non-ionic surfactants. In particular, the present invention relates to a formulation of anionic salts of alkyl alkoxylated sulfates and non-ionic alcohol ethoxylates, for the reduction of the interfacial tension with crude oils during enhanced oil recovery processes. The formulations can effectively be applied for a broad range of crude oils with various compositions and densities, and are stable at temperatures of up to 70° C. and salinity ranges up to 15% including up to 1% divalent cations.

The present invention teaches the use of surfactant formulations in chemical enhanced oil recovery, wherein the formulation comprises:

i) an anionic salt of an alkyl alkoxylated sulfate, wherein the alkyl alkoxylated sulfate has a molecular structure as shown in [I]:

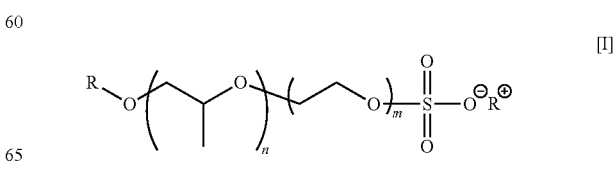

wherein

R is a linear, branched, or mixture of linear and branched alkyl group having from 10 to 20 carbon atoms, preferably 12 to 16 carbon atoms, n=4-15, m=0-10, more preferably m=0.

$M^+$ is an alkali metal ion, an alkanolamine ion, an alkyl amine ion or an ammonium ion; and ii) a non-ionic alcohol ethoxylate, wherein said alcohol ethoxylate has a molecular structure as shown in [II]:

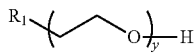

[II]

wherein $R_1$ is a linear, branched, or mixture of linear and branched alkyl group having from 8 to 24 carbon atoms, preferably 12 to 24 carbon atoms, most preferably 20+ carbon atoms, y=20-100, preferably 40<y≤100, more preferably 50≤y≤100.

In a preferred embodiment of the invention, R is a branched alkyl group, more preferably a 2-alkyl branched group.

The invention is further illustrated by surfactant concentrations wherein the weight ratio of i)/ii) is from 6:1 to 1:6, more preferably from 4:1 to 1:4, most preferably from 3:2 to 2:3.

The invention is further exemplified by surfactant formulations wherein the combined concentration of i) and ii) does not exceed 0.5 weight % of the total formulation.

In an additional embodiment of the invention, the surfactant formulation lowers the interfacial tension of crude oil to ultralow values of at or below $10^{-1}$ mN/m, more preferably of at or below $10^{-2}$ mN/m.

Furthermore, the surfactant formulation is able to lower interfacial tension values of crude oil in brines with salinities from 4% up to 15% total dissolved solids.

Another embodiment of the current invention is a method for chemical enhanced oil recovery from a subterranean formation that is penetrated by at least one injection well and one production well, comprising:

i) injecting into an injection well a surfactant formulation such that said surfactant formulation contacts crude oil present in said subterranean formation to lower the interfacial tension of said crude oil to ultralow values at or below $10^{-2}$ mN/m, said surfactant formulation being able to lower interfacial tension values in temperatures of up to 70° C. and in salinities of up to 15% total dissolved solids including up to 1% divalent cations, said surfactant formulation comprising at least a) an anionic salt of an alkyl alkoxylated sulfate, wherein said alkyl alkoxylated sulfate has a molecular structure as shown in [I]:

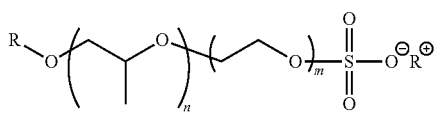

[I]

wherein

R is a linear, branched, or mixture of linear and branched alkyl group having from 10 to 20 carbon atoms, preferably 12 to 16 carbon atoms, n=4-15, m=0-10, M+ is an alkali metal ion, an alkanolamine ion, an alkyl amine ion or an ammonium ion; and b) a non-ionic alcohol ethoxylate, wherein said alcohol ethoxylate has a molecular structure as shown in [II]:

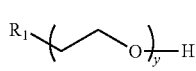

[II]

wherein $R_1$ is a linear, branched or mixture of linear and branched alkyl group having from 8 to 24 carbon atoms, preferably 12 to 24 carbon atoms y=20-100, preferably 40<y≤100, more preferably 50≤y≤100.

ii) recovering oil from the subterranean formation from a production well.

These and further features and advantages of the present invention will become apparent from the following detailed description.

DETAILED DESCRIPTION OF PREFERRED EMBODIMENTS

Figure 1:
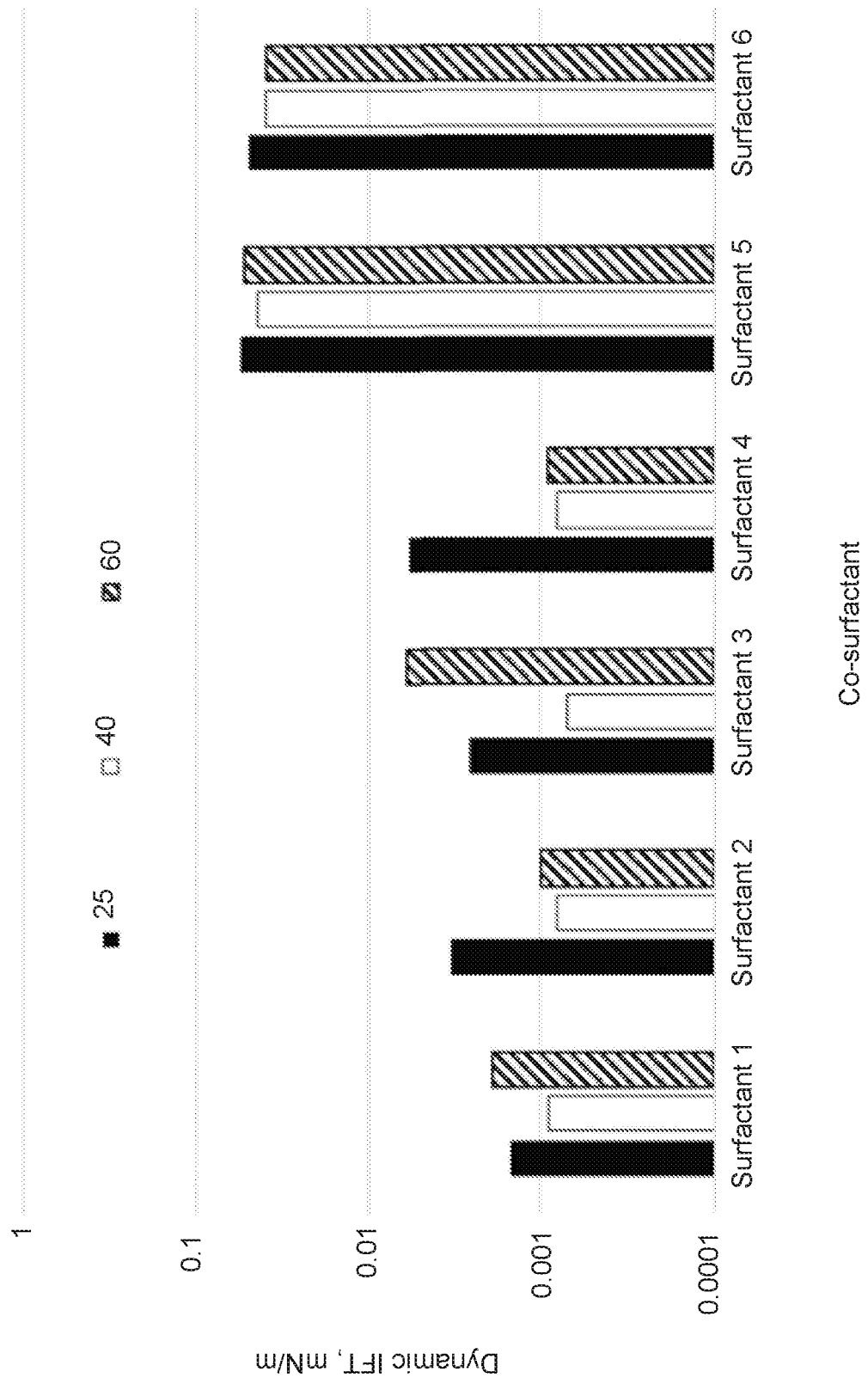
FIG. 1 shows the dynamic IFT in 4% TDS brine of formulations of MIPA salt of ISALCHEM C12/C13-8 PO sulfate (0.4 wt %) and co-surfactant (0.1 wt %) with heavy crude oil (Crude H1) over the temperature range of 25-60° C.

The surfactant formulations of the present invention deliver aqueous-stable solutions over a range of temperatures and salinities, and produce ultra-low interfacial tensions with a very wide variety of crude oils. The performance of these formulations can be improved by tailoring the hydrophobe structures, together with the number of PO and or EO units of both the anionic and non-ionic structures to the needs of a specific well.

Materials

The surfactants used to prepare the surfactant formulations for the examples, are mixtures of anionic and non-ionic surfactants. The anionic surfactants specifically evaluated are in particular methyl isopropyl amine (MIPA) and sodium (Na) salts of alkyl alkoxylated sulfates, and include, but are not limited to the surfactant structures derived from alcohols with propoxy (PO) and/or ethoxy (EO) units as described in Table 1.

TABLE 1

Structures of anionic alkyl alkoxylated sulphate salts

| Alcohol name | Alcohol chain length | Alcohol structure | Number of PO | Number of EO |
|---|---|---|---|---|
| ZIEGLER | C10 | 100% linear | 4-15 | 1 |
| ISALCHEM | C12/C13 | 95% 2-alkyl branched | 4-8 | 0 |
| SAFOL23 | C12/C13 | 50% internally branched, 50% linear | 7-13 | 3 |
| ISOFOL | C12-C16 | 100% 2-alkyl branched | 8-15 | 0 |

The non-ionic co-surfactants used are alkoxylated alcohols, in particular ethoxylated alcohols. Suitable alcohols that can be used to synthesize the above described alkoxylated alcohols include, but are not limited to linear alcohols such as linear C6 alcohols (e.g. ALFOL 6) and C20+ alcohols (e.g. ALFOL 20+), and branched alcohols such as 2-alkyl-1-alkanols (Guerbet alcohols, e.g. ISOFOL 12 and ISOFOL 20), and isotridecyl alcohols (e.g. MARLIPAL O13, a C13 oxo-alcohol). All examples represented by trade names are marketed by Sasol Performance Chemicals.

TABLE 2

Structures of non-ionic ethoxylated alcohols.

| Non-ionic Co-surfactant | Alcohol name | Alcohol chain length | Alcohol structure | Number of EO |
|---|---|---|---|---|
| Surfactant 1 | ALFOL20+ | C20+ | linear, long alkyl chain | 20, 50, 75, 100 |
| Surfactant 2 | ISOFOL 20 | C20 | 2-alkyl branched, long chain | 50 |
| Surfactant 3 | ISOFOL 24 | C24 | 2-alkyl branched, long chain | 50 |
| Surfactant 4 | ALFOL20+ | C20+ | linear, long chain | 25 |
| Surfactant 5 | iTDA (isotridecanol) | C13 | branched, medium chain | 50 |
| Surfactant 6 | ISOFOL 12 | C12 | 2-alkyl branched, medium chain | 50 |
| Surfactant 7 | ALFOL 6 | C6 | linear, short chain | 50 |
| Surfactant 8 | iTDA (isotridecanol) | C13 | branched, medium chain | 30 |
| Surfactant 9 | ISOFOL 12 | C12 | 2-alkyl branched, medium chain | 29 |
| Surfactant 10 | ALFOL 6 | C6 | linear, short chain | 15 |
| Surfactant 11 | iTDA (isotridecanol) | C13 | branched, medium chain | 8 |
| Surfactant 12 | 2-ethylhexanol | C8 | branched, short chain | 50 |

Experimental Section

The brines used in this study have the composition and total dissolved solid (TDS) as shown in Table 3. Brine A, Brine B and Brine C have total divalent concentrations of ~4%, 11.8%, and 15%, respectively.

TABLE 3

Composition of brines used.

| Component | Composition, g/L |
|---|---|
| (a) Brine A with 4% TDS | |
| NaCl | 30.39 |
| KCl | 1.51 |
| $CaCl_2 \cdot 2H_2O$ | 6.73 |
| $MgCl_2 \cdot 6H_2O$ | 1.39 |
| TDS | 4% |
| (b) Brine B with 11.8% TDS | |
| NaCl | 106.03 |
| $Na_2SO_4$ | 0.74 |
| $MgCl_2 \cdot 6H_2O$ | 1.23 |
| $CaCl_2$ | 10.767 |
| TDS | 11.8% |
| (c) Brine C with 15% TDS | |
| NaCl | 113.96 |
| KCl | 5.65 |
| $MgCl_2 \cdot 6H_2O$ | 5.23 |
| $CaCl_2 \cdot 2H_2O$ | 25.25 |
| TDS | 15% |

Crude oils used in this study have the compositions and densities listed in Table 4. As used herein, the terms "heavy crude" and "light crude" are as follows:

heavy crude is crude oil which has less than 30% by weight of hydrocarbons having carbon chains of less than C15, and an API gravity below 30°; and light crude is crude oil which has 30% or more by weight of hydrocarbons having carbon chains less than C15, and an API gravity at or above 30°.

TABLE 4

Composition and density of crude oils used.

| Crude oil | % <C15 | % Saturate | % Aromatic | % Resin | % Asphaltene | Density at 20° C., g/mL | API gravity, °API |
|---|---|---|---|---|---|---|---|
| (a) Heavy crude oils |
| Crude H1 | 13.90 | 50.27 | 26.52 | 22.67 | 0.53 | 0.8939 | 26.8 |
| Crude H2 | 22.13 | 19.78 | 51.02 | 17.11 | 12.09 | 0.9745 | 13.7 |
| Crude H3 | 24.10 | 40.69 | 36.48 | 15.43 | 7.40 | 0.8920 | 27.1 |
| Crude H4 | 28.96 | 18.33 | 44.55 | 23.79 | 13.33 | 0.9700 | 14.4 |
| (b) Light crude oils |
| Crude L1 | 55.46 | 60.13 | 32.29 | 7.35 | 0.22 | 0.8334 | 38.1 |
| Crude L2 | 42.28 | 45.57 | 41.62 | 12.81 | 0.00 | 0.8549 | 34.0 |

Experimental Methods

Sample Preparation

Stock solutions of 10% of each of the anionic sulfates and the non-ionic alcohol ethoxylates (AE's) in nanopure water were prepared prior to formulation.

The formulations were subsequently prepared to the desired concentration of each surfactant from the stock solutions in each of the brines listed in Table 3. The concentration of the anionic sulfate in the formulation preferably ranges from 0.15 to 0.4 wt %. The concentration of the non-ionicethoxylate in the formulation ranges preferably from
0.1 to 0.35 wt %. The total surfactant concentration in the formulation was kept constant at 0.5 wt %.

Aqueous Stability Test

The prepared formulations were placed in the oven at temperatures ranging from 25 to 70° C. for a period of at least 3 months. The formulations were continuously visually inspected for any phase separation (PS), cloudiness and precipitation. Formulations that showed signs of phase separation, cloudiness, or precipitation failed the aqueous stability test. Formulations that remained clear over time passed the aqueous stability test.

Unless otherwise indicated, throughout this application the performance of aqueous stability tests followed the process set forth above.

Dynamic IFT Measurement

Formulations that passed the aqueous stability test were measured for dynamic IFT against each of the crude oils from Table 4 at different temperatures using DataPhysics Interfacial Tensiometer. The capillary tube was filled with ~2 mL of the denser phase, which was the surfactant formulation. An amount of 2-3 µL of oil, which is the less dense phase, was injected into the capillary tube filled with the surfactant solution and formed a droplet. The capillary tube was then inserted into the spinning compartment of the instrument. As the tube was spun, the oil droplet started stretching and the IFT value was generated. The IFT gradually changed at first and became constant after 15 minutes in most cases. Once the IFT value remained constant, it was recorded.

Unless otherwise indicated, throughout this application the measurement of dynamic IFT followed the process set forth above.

Results

Formulations with only anionic surfactants, namely the salts of alkyl propoxy ethoxy sulfates described in this invention, prepared in the brines listed in Table 3, did not pass the aqueous stability over the temperature range of 25-70° C. Therefore, a co-surfactant (non-ionic surfactant) was required to improve the aqueous stability of the anionic sulfate surfactants.

EXPERIMENT 1: Aqueous Stability Tests
(Formulations of Anionic and Non-Ionic Surfactants)

The aqueous stabilities of the formulations of an anionic surfactant, namely a MIPA salt of C12/C13-8 PO sulfate (0.4 wt %) and various non-ionic alcohol ethoxylates (AE) as co-surfactant (0.1 wt %) were determined over the temperature ranges of 25-60° C. in 4% TDS brine. The results are shown in Table 5.

TABLE 5

Aqueous stability of 0.4 wt % MIPA salt of ISALCHEM C12/C13 − 8PO sul- fate and 0.1 wt % co-surfactant in 4% TDS brine (PS/cloudy = the solution phase separates and becomes cloudy upon mixing).

| Co-surfactant | Alcohol name | Alcohol chain length | Alcohol structure | # EO | 25° C. | 40° C. | 60° C. |
|---|---|---|---|---|---|---|---|
| Surfactant 1 | ALFOL20+ | C20+ | linear, heavy chain | 50 | clear | clear | clear |
| Surfactant 2 | ISOFOL 20 | C20 | 2-alkyl branched, long chain | 50 | clear | clear | clear |
| Surfactant 3 | ISOFOL 24 | C24 | 2-alkyl branched, heavy chain | 50 | clear | clear | clear |
| Surfactant 4 | ALFOL20+ | C20+ | linear, heavy chain | 25 | clear | clear | clear |

TABLE 5-continued

Aqueous stability of 0.4 wt % MIPA salt of ISALCHEM C12/C13 – 8PO
sul- fate and 0.1 wt % co-surfactant in 4% TDS brine (PS/cloudy = the solution
phase separates and becomes cloudy upon mixing).

| Co-surfactant | Alcohol name | Alcohol chain length | Alcohol structure | # EO | 25° C. | 40° C. | 60° C. |
|---|---|---|---|---|---|---|---|
| Surfactant 5 | iTDA (isotride-canol) | C13 | branched, medium chain | 50 | clear | clear | clear |
| Surfactant 6 | ISOFOL 12 | C12 | 2-alkyl branched, medium chain | 50 | clear | clear | clear |
| Surfactant 7 | ALFOL 6 | C6 | linear, short chain | 50 | clear | clear | PS/cloudy |
| Surfactant 8 | iTDA (isotride-canol) | C13 | branched, medium chain | 30 | clear | clear | PS/cloudy |
| Surfactant 9 | ISOFOL 12 | C12 | 2-alkyl branched, medium chain | 29 | clear | clear | PS/cloudy |
| Surfactant 10 | ALFOL 6 | C6 | linear, short chain | 15 | clear | clear | PS/cloudy |
| Surfactant 11 | iTDA (isotride-canol) | C13 | branched, medium chain | 8 | clear | cloudy | PS/cloudy |

As can be seen in Table 5, formulations with short chain AE's (C6) containing 15 and 50 EO units (Surfactant 7 and Surfactant 10) as co-surfactant, did not pass the aqueous stability test at 60° C. Formulations with medium chain AE's (C12/C13) containing 30 EO units and less (Surfactant 8, Surfactant 9 and Surfactant 10), also did not pass the aqueous stability test at 60° C. Formulations using medium chain AE's containing 50 EO units, and long, heavy chain AE's containing 25 EO units and higher, pass the aqueous stability test over the entire temperature range.

EXPERIMENT 2: Determination of Dynamic Interfacial Tension (IFT) Values (Various Crudes)

The dynamic IFT's of the formulations using Surfactant 1 to Surfactant 6 (since they passed the aqueous stability test up to 70° C.) were measured against the various crude oils at different temperatures.

Experiment 2.1

The dynamic IFT values for formulations containing Surfactants 1-6 (0.1 wt %) together with anionic surfactant ISALCHEM C12/13-8 PO sulfate MIPA salt (0.4 wt %) were determined in heavy crude oil (H1) over the temperature range of 25-60° C. (4% TDS brine). Results are shown in FIG. 1.

Formulations using long, heavy chain co-surfactants with 25 and 50 EO units (Surfactant 1 to Surfactant 4), produce ultralow IFT (<0.01 mN/m) for the heavy crude oil (Crude H1) at all temperatures from 25 to 60° C. Formulations using medium chain co-surfactants with 50 EO units (Surfactant 5 and Surfactant 6) were not able to produce ultralow IFT for Crude H1, as seen in FIG. 1.

Experiment 2.2

In addition, the dynamic IFT values for formulations containing Surfactants 1-6 (0.1 wt %) together with anionic surfactant ISALCHEM C12/13-8PO sulfate MIPA salt (0.4 wt %) were determined in light crude oil (L1) over the temperature range of 25-60° C. (4% TDS brine). Results are shown in FIG. 2.

Figure 2:
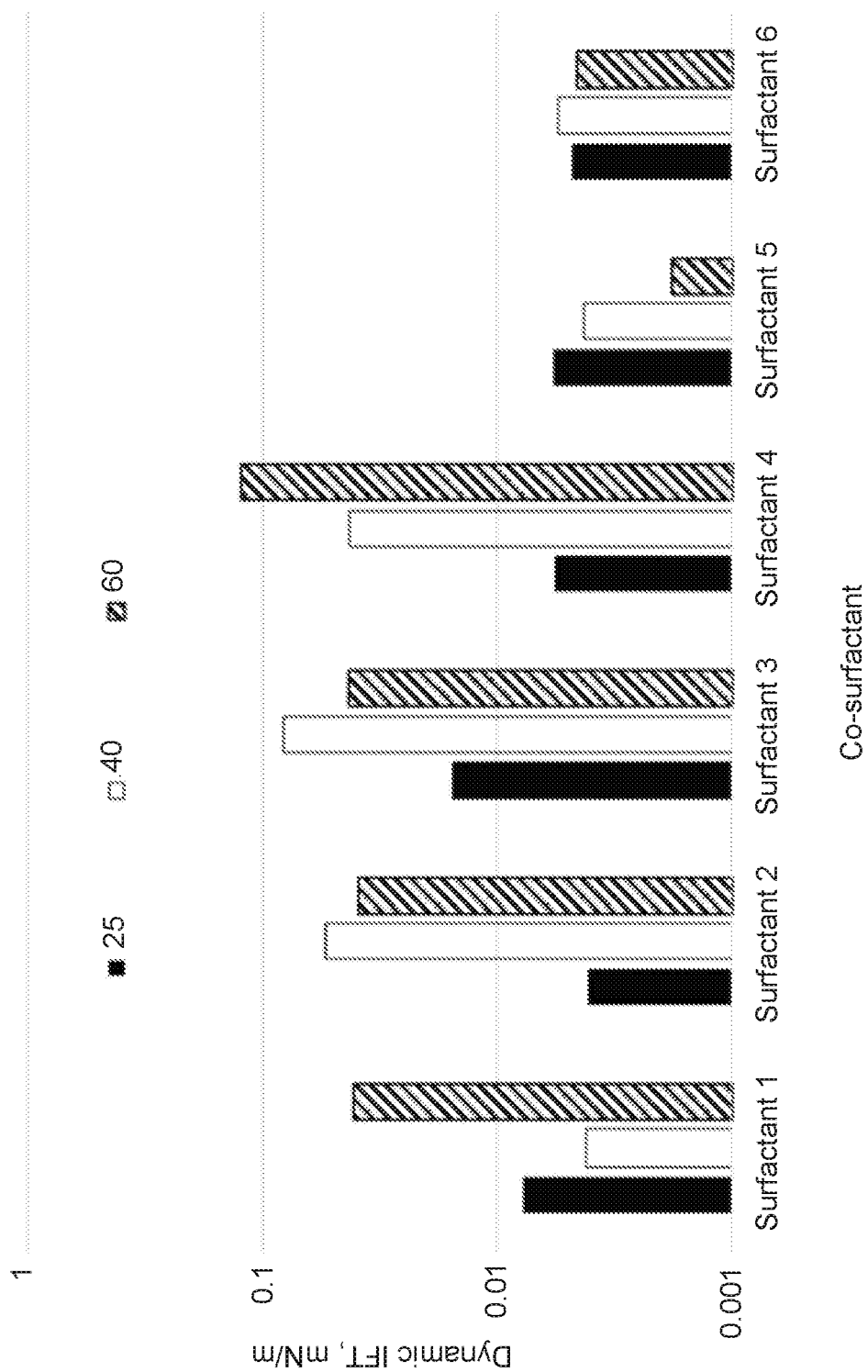
FIG. 2 shows the dynamic IFT in 4% TDS brine of MIPA salt of ISALCHEM C12/C13-8 PO sulfate (0.4 wt %) and co-surfactant (0.1 wt %) with light crude oil (Crude L1) over the temperature range of 25-60° C.

Only Surfactant 5 and Surfactant 6 (medium chain co-surfactants with 50 EO units) were able to produce ultralow IFT for the light crude (Crude L1) over the whole range of temperature as seen in FIG. 2.

Experiment 2.3

In order to further validate the results obtained in Experiments 2.1 and 2.2, the dynamic IFT values for formulations containing Surfactants 1, 4, 5 and 6 (0.1 wt %) together with anionic surfactant ISALCHEM 012/13-8PO sulfate MIPA salt (0.4 wt %) were determined in various crude oils over the temperature range of 25-60° C. (4% TDS brine). Results are shown in FIGS. 3-5.

Figure 3:
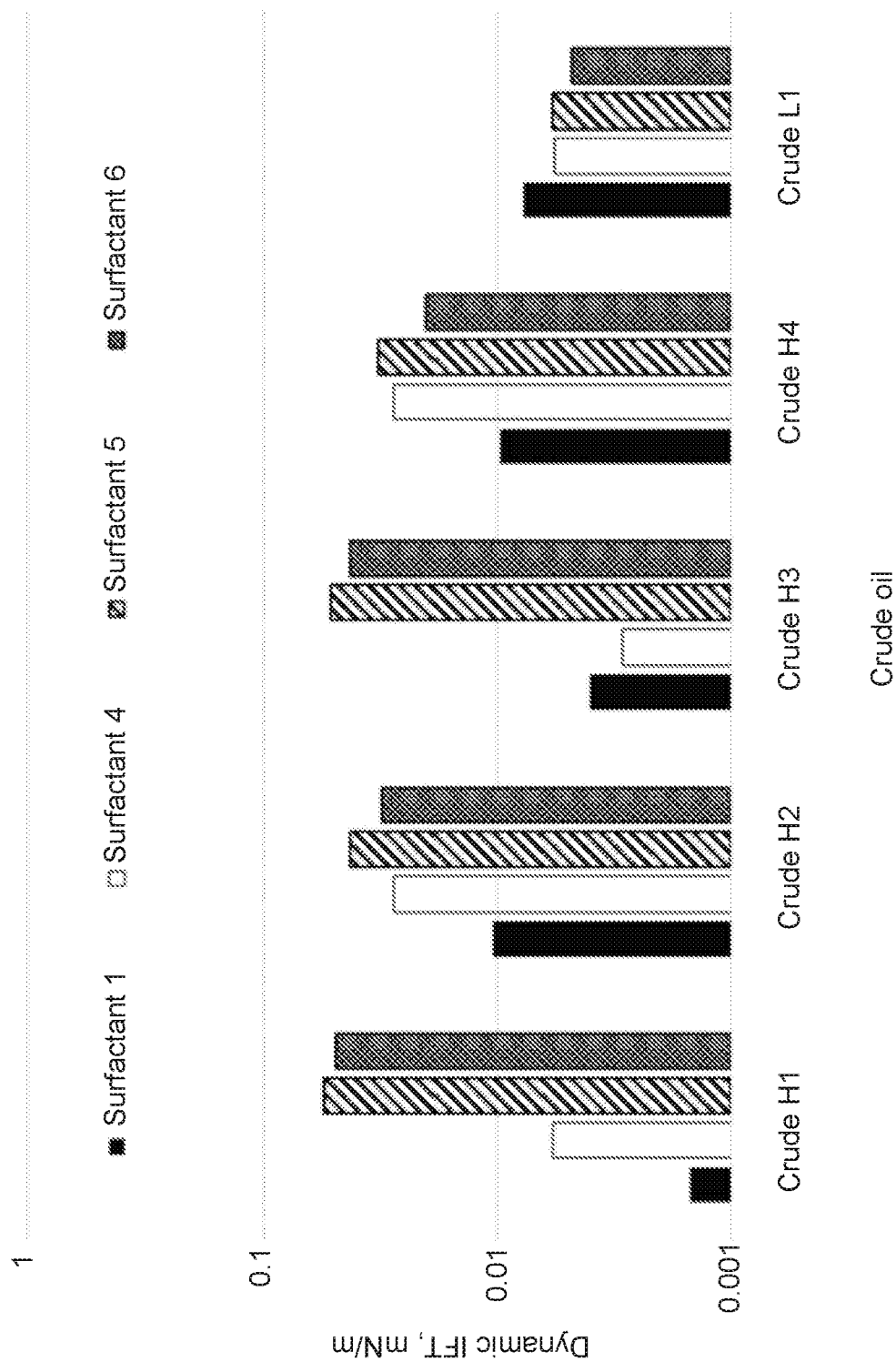
FIG. 3 shows the dynamic IFT in 4% TDS brine of MIPA salt of ISALCHEM C12/C13-8 PO sulfate (0.4 wt %) and co-surfactant (0.1 wt %) for various crude oils at 25° C.
Figure 4:
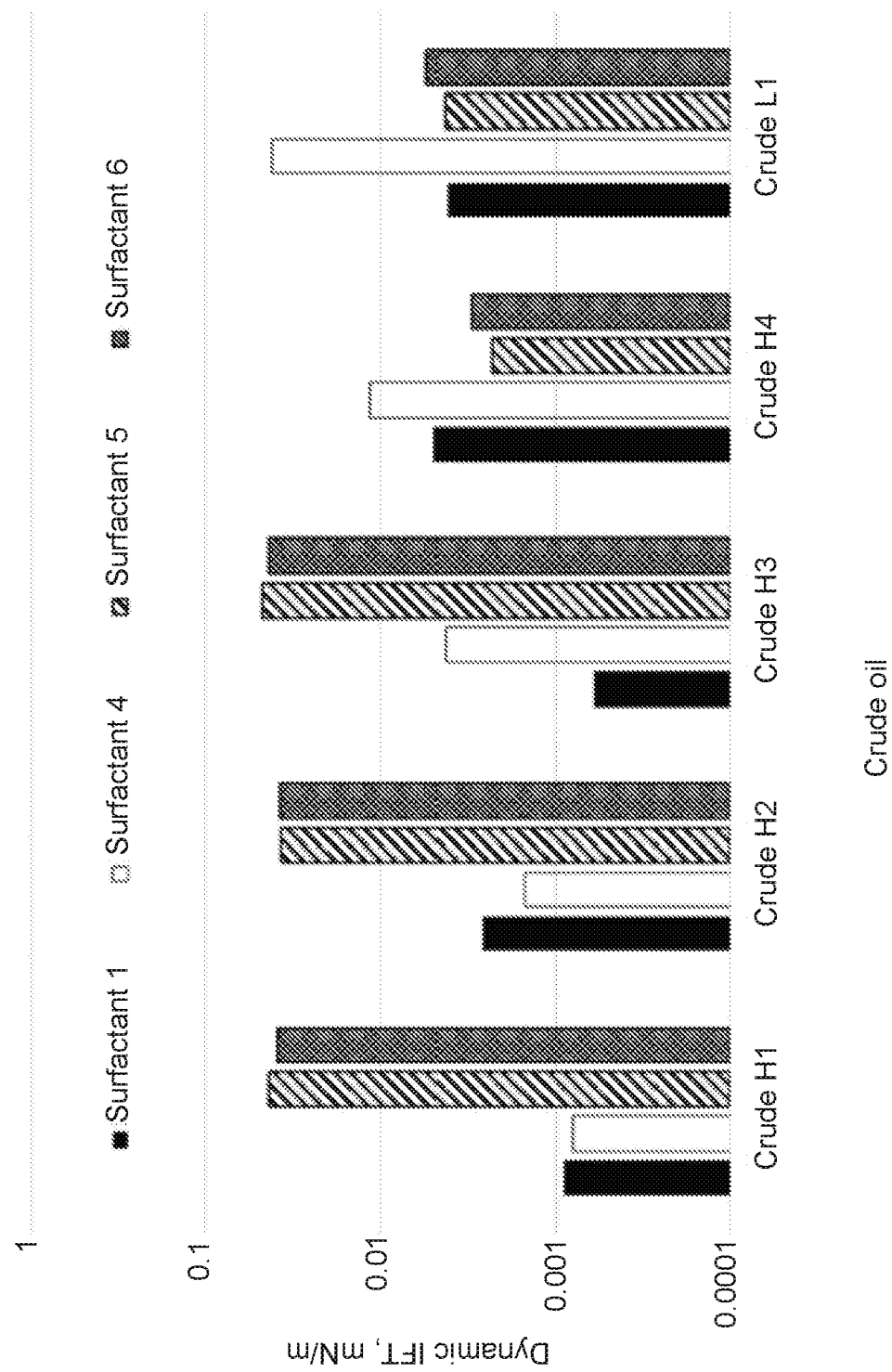
FIG. 4 shows the dynamic IFT in 4% TDS brine of MIPA salt of ISALCHEM C12/C13-8 PO sulfate (0.4 wt %) and co-surfactant (0.1 wt %) for various crude oils at 40° C.
Figure 5:
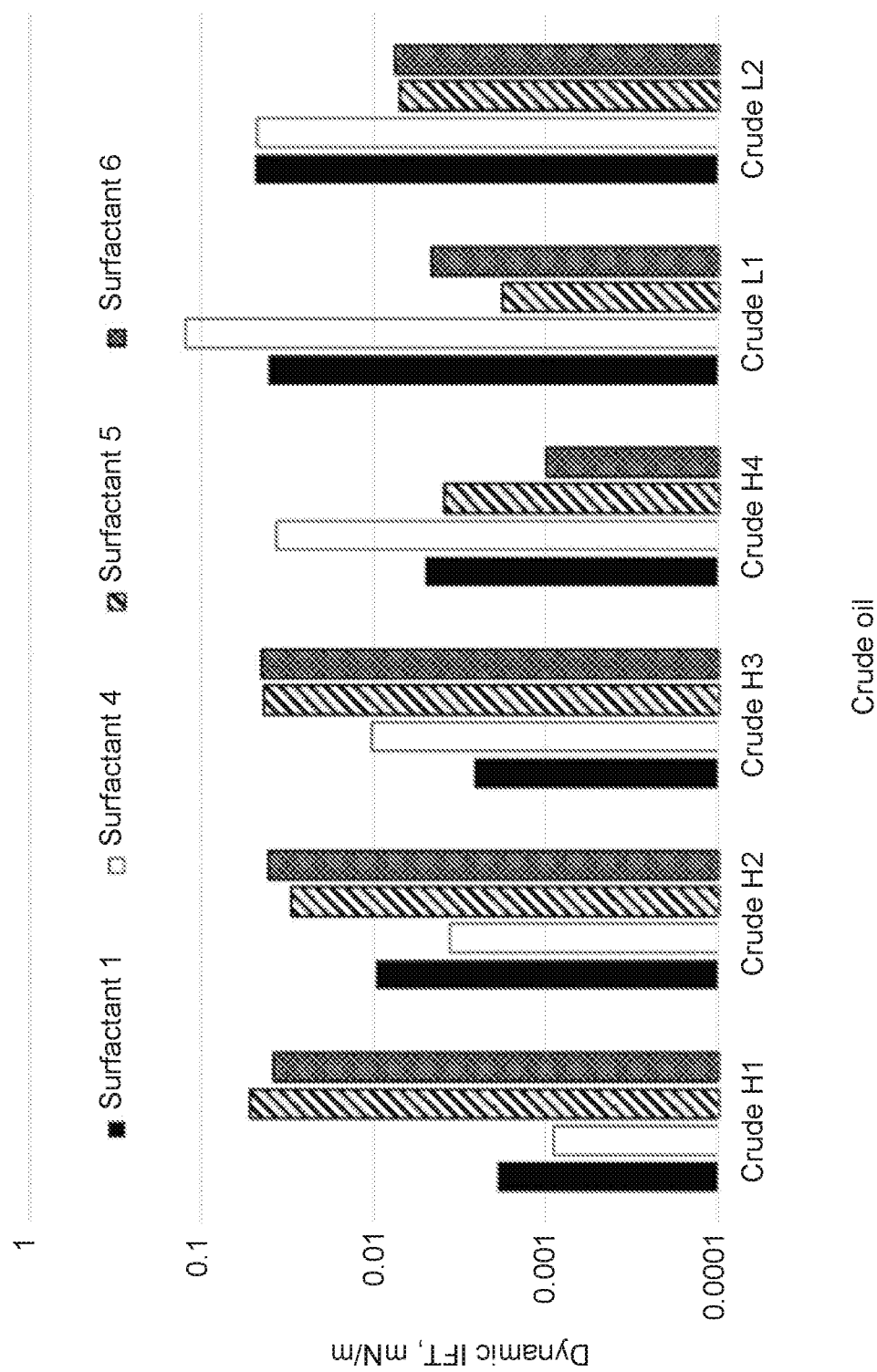
FIG. 5 shows the dynamic IFT in 4% TDS brine of MIPA salt of ISALCHEM C12/C13-8 PO sulfate (0.4 wt %) and co-surfactant (0.1 wt %) for various crude oils at 60° C.

The IFT results in FIGS. 3-5 further validate the findings that Surfactant 1 to Surfactant 4 were able to produce ultralow IFT for heavy crude oils and Surfactant 5 and Surfactant 6 were able to produce ultralow IFT for light crude oils over the range of temperatures 25-60° C.

EXPERIMENT 3: Effect of Anionic vs Non-Ionic Surfactant Blending Ratios on Aqueous Stability and IFT Values In order to demonstrate the effect of various blending ratios between the anionic and non-ionic surfactants on the aqueous stability and IFT values, two anionic surfactants, namely MIPA salts of ISALCHEM C12/13-8PO sulfate and ISOFOL 016-8PO sulfate, together with non-ionic Surfactant 1, were determined.

Experiment 3.1: Aqueous Stability Tests

The aqueous stability of the formulation of both anionic surfactant ISALCHEM C12/13-8PO sulfate (MIPA salt) and Surfactant 1 (various ratios) were determined in a brine solution of 4% TDS at temperatures 25-70° C. Results are shown in Table 6.

TABLE 6

Aqueous stability of blends of anionic sulfate and non-ionic ethoxylated alcohol at various surfactant ratios in 4% TDS brine at up to 70° C.

| Anionic sulfate, wt % | Surfactant 1, wt % | 25° C. | 40° C. | 60° C. | 70° C. |
|---|---|---|---|---|---|
| (a) Anionic sulfate is MIPA salt of ISALCHEM C12/C13 - 8PO sulfate | | | | | |
| 0.5 | 0 | Cloudy | cloudy | PS/cloudy | PS/cloudy |
| 0.45 | 0.05 | Clear | clear | PS/cloudy | PS/cloudy |

TABLE 6-continued

Aqueous stability of blends of anionic sulfate and
non-ionic ethoxylated alcohol at various surfactant
ratios in 4% TDS brine at up to 70° C.

| Anionic sulfate, wt % | Surfactant 1, wt % | 25° C. | 40° C. | 60° C. | 70° C. |
|---|---|---|---|---|---|
| 0.4 | 0.1 | Clear | clear | Clear | Clear |
| 0.35 | 0.15 | Clear | clear | Clear | Clear |
| 0.3 | 0.2 | Clear | clear | Clear | Clear |
| 0.25 | 0.25 | Clear | clear | Clear | Clear |
| 0.2 | 0.3 | Clear | clear | Clear | Clear |
| 0.15 | 0.35 | Clear | clear | Clear | Clear |
| 0.1 | 0.4 | Clear | clear | Clear | Clear |
| (b) Anionic sulfate is MIPA salt of ISOFOL C16 - 8PO sulfate | | | | | |
| 0.5 | 0 | Cloudy | cloudy | PS/cloudy | PS/cloudy |
| 0.45 | 0.05 | Clear | clear | PS/cloudy | PS/cloudy |
| 0.4 | 0.1 | Clear | clear | Clear | clear |
| 0.35 | 0.15 | Clear | clear | Clear | clear |
| 0.3 | 0.2 | Clear | clear | Clear | clear |
| 0.25 | 0.25 | Clear | clear | Clear | clear |
| 0.2 | 0.3 | Clear | clear | Clear | clear |
| 0.15 | 0.35 | Clear | clear | Clear | clear |
| 0.1 | 0.4 | Clear | clear | Clear | clear |

Without the co-surfactant, the anionic sulfate solution at 0.5 wt % concentration in 4% TDS brine was cloudy at 25° C. up to 70° C. The anionic/non-ionic surfactant blends were only clear when the concentration of the non-ionic surfactant was 0.1 wt % or higher with the total surfactant concentration being 0.5 wt %.

Experiment 3.2: Determination of IFT Values for Various Surfactant Ratios in Heavy Crude The dynamic IFT values in heavy crude (crude H1) of the formulation of both anionic surfactant ISALCHEM C12/13-8PO sulfate (MIPA salt) and Surfactant 1 (various ratios) were determined in a brine solution of 4% TDS at 25° C. Results are shown in FIG. 6.

Figure 6A:
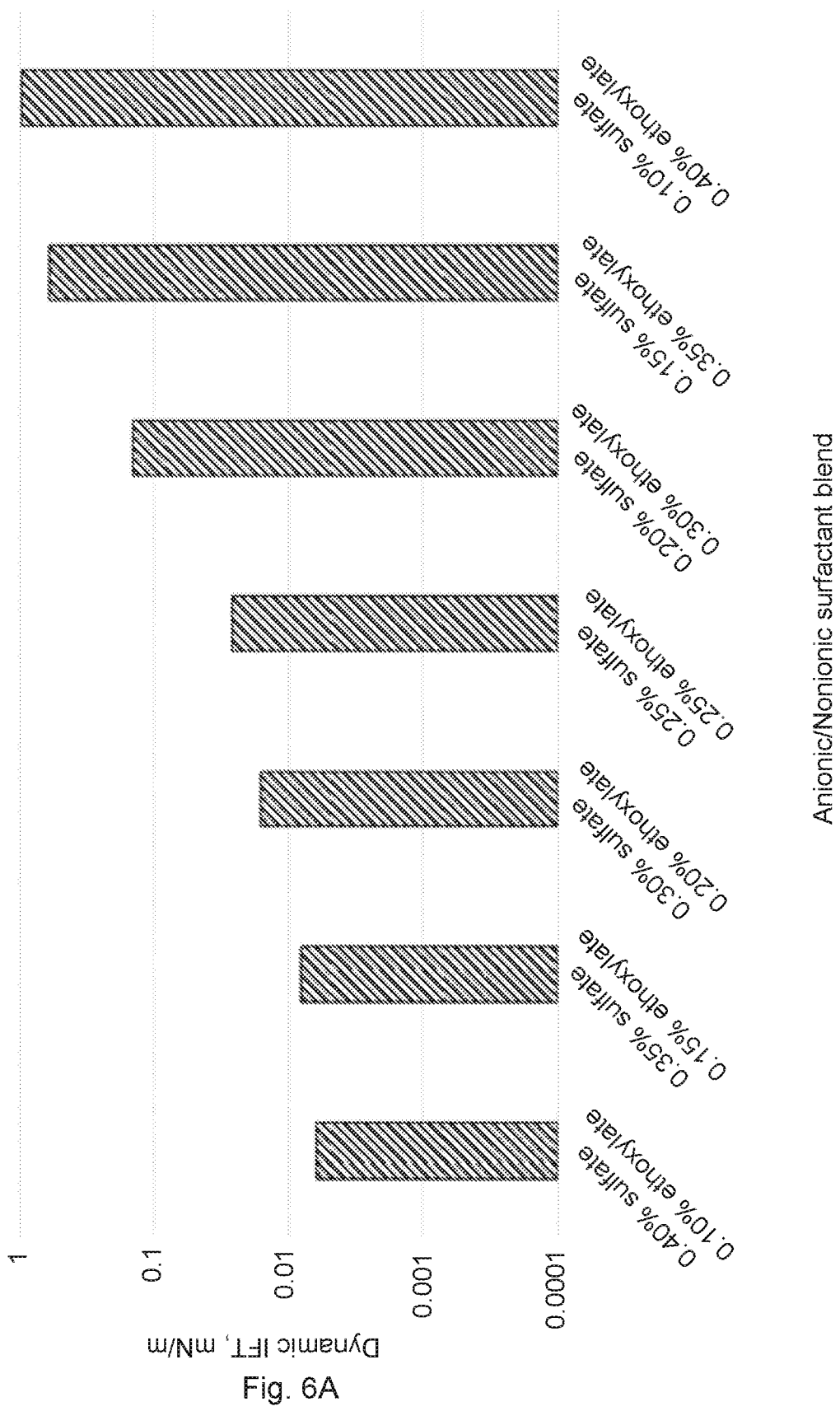
FIG. 6A shows the dynamic IFT of MIPA salt of ISALCHEM C12/C13-8 PO sulfate and Surfactant 1 at various surfactant concentration ratios in 4% TDS brine for Crude H1 oil at 25° C.
Figure 6B:
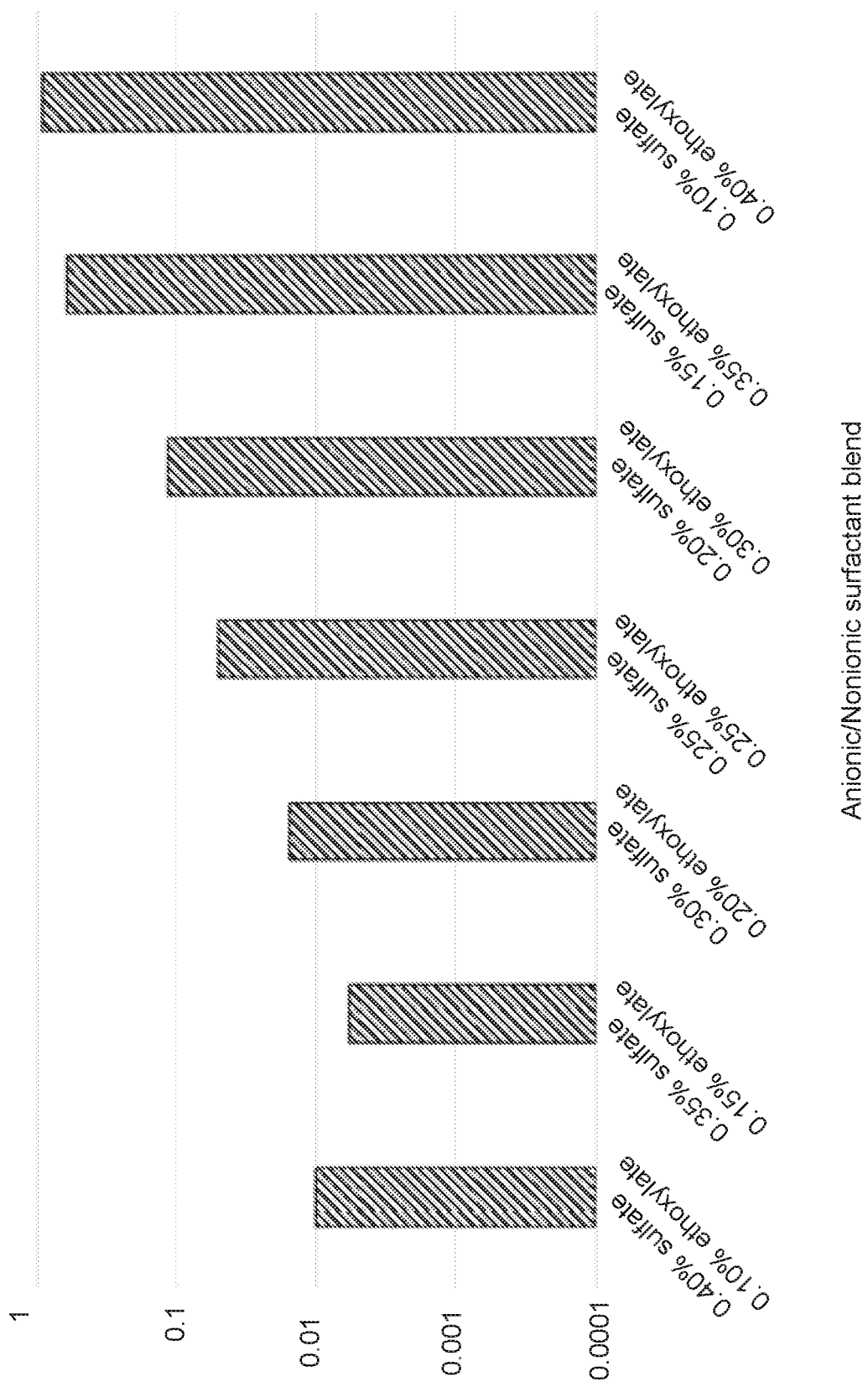
FIG. 6B shows the dynamic IFT of MIPA salt of ISOFOL C16-8 PO sulfate and Surfactant 1 at various surfactant concentration ratios in 4% TDS brine for Crude H1 oil at 25° C.

FIG. 6 shows that the dynamic IFT for Crude H1 oil was affected by the anionic/non-ionic ratio. For MIPA salt of ISALCHEM C12/C13-8PO sulfate, the IFT was lowest at anionic/non-ionic ratio of 0.4 wt %/0.1 wt % while it was 0.35 wt %/0.15 wt % for MIPA salt of ISOFOL C16-8PO sulfate.

Experiment 3.3: IFT Values in a High TDS % Brine Solution in Various Crudes a) The dynamic IFT values for a blend of 0.25 wt % anionic surfactant (ISALCHEM 012/013-4PO sulfate, MIPA salt)/0.25 wt % non-ionic surfactant (Surfactant 1) were determined with various crudes at temperatures 25 and 40° C., using a brine solution of 11.8% TDS. Results are shown in FIG. 7.

Figure 7:
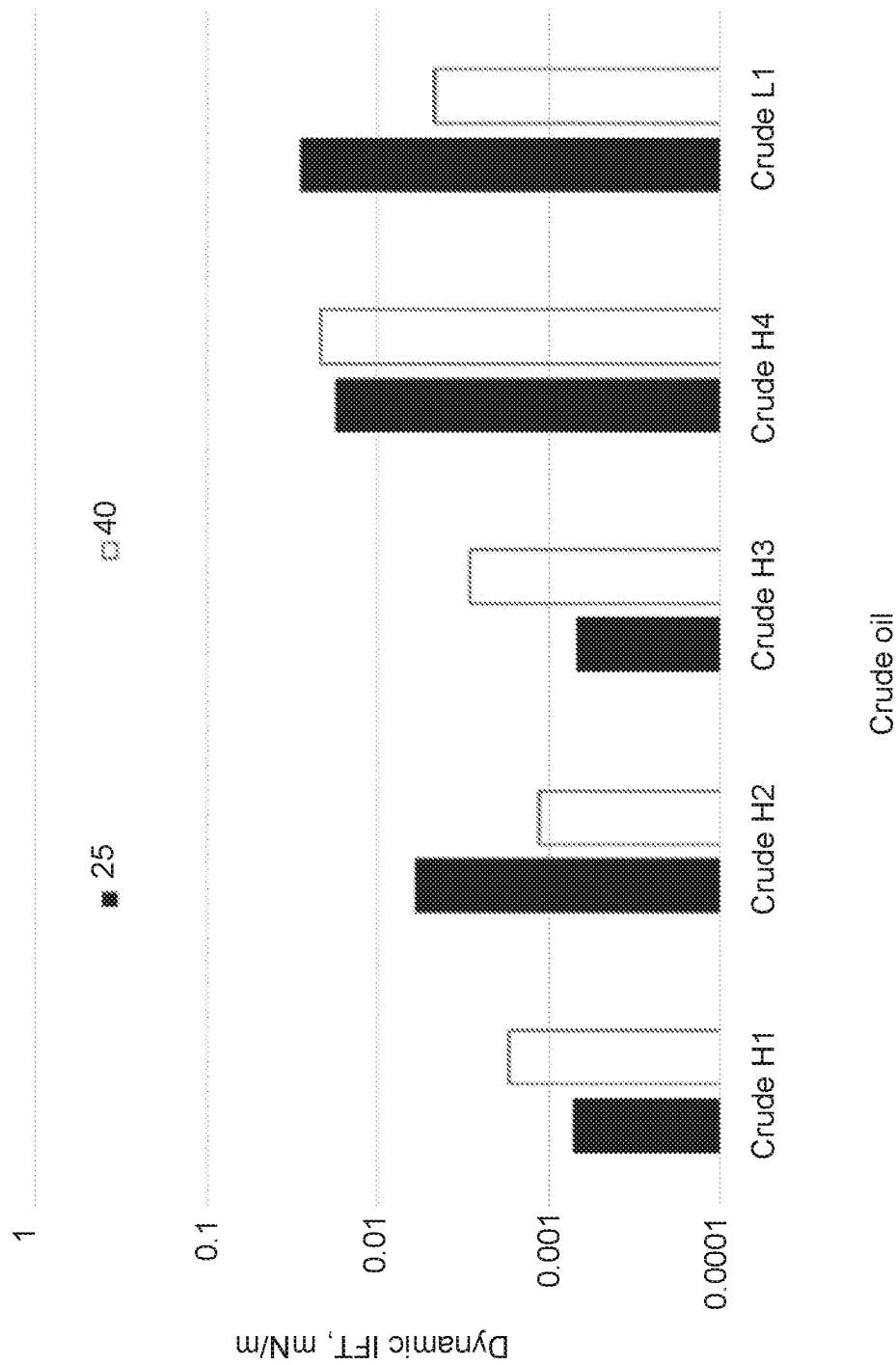
FIG. 7 shows the dynamic IFT in 11.8% TDS brine of MIPA salt of ISALCHEM C12/C13-4 PO sulfate (0.25 wt %) and Surfactant 1 (0.25 wt %) for various crude oils at 25° C.-40° C.
Figure 8:
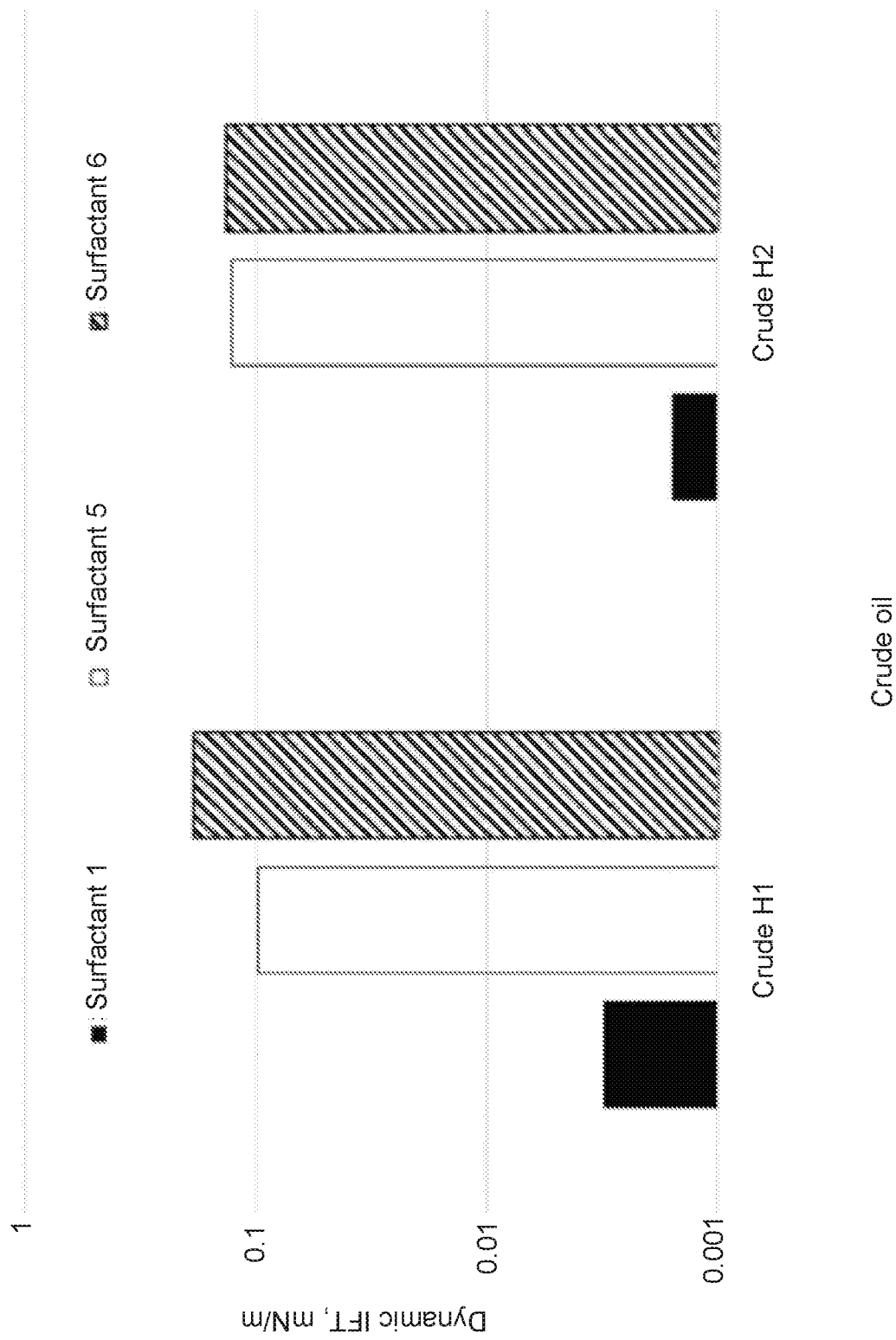
FIG. 8 shows the dynamic IFT in 11.8% TDS brine of MIPA salt of ISALCHEM C12/C13-4 PO sulfate (0.25 wt %) and co-surfactant (0.25 wt %) for various crude oils at 40° C.

FIG. 7 demonstrates that the formulation of the MIPA salt of ISALCHEM C12/13-4PO (0.25 wt %) and Surfactant 1 (0.25 wt %) in 11.8% TDS brine for various crude oils at 25 and 40° C. was able to produce ultralow IFT values.

b) The dynamic IFT values for a blend of 0.25 wt % anionic surfactant (ISALCHEM C12/C13-4PO sulfate, MIPA salt) and various non-ionic surfactants (Surfactant 1, 5 and 6—all 0.25 wt %) were determined with heavy crudes (Crude H1 and H2) at temperatures 40° C., using a brine solution of 11.8% TDS. Results are shown in FIG. 8. Non-ionic Surfactant 1 produced an ultra-low IFT value at the conditions described above.

In addition to the detailed experiments described above, the invention was further exemplified over an extended range of experimental conditions for a variety of combinations of surfactants/ratios of surfactants in heavy and light crudes. The results for various anionic surfactants combined with Surfactant 1 (specifically ALFOL C20+50EO) are summarised in Table 7.1 below (Exp. 4-9). Table 7.2 further illustrates variations of surfactant combinations and different conditions (Exp. 10-15). Aqueous stabilities and dynamic interfacial tensions were determined according to the general procedures described earlier.

TABLE 7.1

Summarised results for various anionic surfactants combined with Surfactant 1
(specifically ALFOL C20+ 50EO), illustrated over an extended range of experimental conditions in heavy and light crude

| EXP | ANIONIC SURFACTANT Name | Wt % | NON-IONIC SURFACTANT Name | Wt % | TDS (%) | AQUEOUS STABILITY Appearance | | | DYNAMIC INTERFACIAL TENSION | | | | | |
|---|---|---|---|---|---|---|---|---|---|---|---|---|---|---|
| | | | | | | | | | Heavy Crude (H1) | | | Light Crude (L1) | | |
| | | | | | | 25° C. | 40° C. | 70° C. | 25° C. | 40° C. | 70° C. | 25° C. | 40° C. | 70° C. |
| 4 | Ziegler C10-4PO-1EO sulfate, Na salt | 0.40 0.35 | Surfactant 1: 50EO | 0.10 0.15 | 11.8 | clear clear | clear clear | | 0.0015 0.0011 | | | 0.0432 0.0364 | | |
| 5 | ISOFOL C12-15PO sulfate, MIPA salt | 0.25 0.15 | Surfactant 1: 50EO | 0.25 0.35 | 4.0 | clear clear | | clear clear | | 0.3000 0.0930 | | | 0.0015 0.0100 | |
| 6 | SAFOL C1213-13PO-3EO sulfate, MIPA salt | 0.40 0.25 | Surfactant 1: 50EO | 0.10 0.25 | 4.0 | clear clear | | clear clear | | 0.0016 0.0550 | | | 0.0127 0.0028 | |
| 7 | SAFOL C1213-7PO-3EO sulfate, MIPA salt | 0.30 0.25 0.20 | Surfactant 1: 50EO | 0.20 0.25 0.30 | 11.8 | clear clear clear | clear clear clear | | 0.0027 0.0037 0.0170 | | | 0.0136 — 0.0048 | | |
| 8 | ISALCHEM C1213-4PO sulfate, Na salt | 0.35 0.25 0.15 | Surfactant 1: 50EO | 0.15 0.25 0.35 | 11.8 | clear clear clear | | | 0.0011 0.0089 0.0031 0.0153 | | | 0.0364 0.0162 0.0196 0.0060 | | |
| 9 | ISALCHEM C1213-4PO sulfate, Na salt | 0.20 0.15 | Surfactant 1: 50EO | 0.30 0.35 | 15.0 | clear clear | clear clear | | 0.0052 0.0354 | 0.0059 0.0135 | | 0.0441 0.0095 | 0.0145 0.0095 | |

TABLE 7.2

Summarised results for various anionic surfactants combined with various non-ionic surfactants, illustrated over an extended range of experimental conditions in heavy and light crude

| | ANIONIC SURFACTANT | | NON-IONIC SURFACTANT | | TDS | AQUEOUS STABILITY Appearance | | | DYNAMIC INTERFACIAL TENSION | | | | | |
|---|---|---|---|---|---|---|---|---|---|---|---|---|---|---|
| | | | | | | | | | Heavy Crude (H1) | | | Light Crude (L1) | | |
| EXP | Name | Wt % | Name | Wt % | (%) | 25° C. | 40° C. | 70° C. | 25° C. | 40° C. | 70° C. | 25° C. | 40° C. | 70° C. |
| 10 | ISALCHEM C1213-8PO sulfate, Na salt | 0.20 0.15 | Surfactant 12: 50EO | 0.30 0.35 | 4.0 | clear clear | | clear clear cloud | | 0.031 0.0426 | | | 0.0025 0.0030 | |
| 11 | ISALCHEM C1213-4PO sulfate, Na salt | 0.35 0.30 | Surfactant 12: 50EO | 0.15 0.20 | 11.8 | clear clear | | | | 0.0352 0.0853 | | | 0.0030 0.0190 | |
| 12 | ISALCHEM C1213-8PO sulfate, MIPA salt | 0.30 0.25 0.15 | Surfactant 1: 75EO | 0.20 0.25 0.35 | 4.0 | clear clear clear | clear clear clear | clear clear clear | 0.0123 | 0.0060 0.0144 | 0.0049 0.0700 | 0.0110 | 0.0083 0.0090 | 0.0017 0.0132 |
| 13 | ISALCHEM C1213-4PO sulfate, MIPA salt | 0.25 0.20 0.15 | Surfactant 1: 75EO | 0.25 0.30 0.35 | 11.8 | clear | clear clear | clear | 0.2378 | 0.0022 0.0974 | 0.0400 | 0.0175 | 0.0080 0.0070 0.0170 | |
| 14 | ISALCHEM C1213-4PO sulfate, MIPA salt | 0.20 0.15 | Surfactant 1: 100EO | 0.30 0.35 | 11.8 | clear | clear clear | clear | 0.0285 | 0.0030 0.0168 | 0.0268 | 0.0069 | 0.0074 0.0065 | 0.0080 |
| 15 | ISALCHEM C1213-8PO sulfate, MIPA salt | 0.35 0.25 0.20 | Surfactant 1: 20EO | 0.15 0.25 0.30 | 4.0 | clear | clear clear | clear clear | 0.0118 | 0.0010 0.0080 | 0.0270 0.0590 | 0.0097 | 0.0142 | 0.0036 0.0020 |

Tables 7.1 and 7.2 illustrate the superior performance of the invention's surfactant formulations, specifically with regard to aqueous stability and ultralow IFT values, obtained over a wide range of temperatures, salinities and concentrations.

REFERENCES

Puerto, M., Hirasaki, G. J., Miller, C. A. et al. 2012. Surfactant Systems for EOR in High-Temperature, High-Salinity Environments. SPE Journal, 17 (1), 11-19. https://doi.org/10.2118/129675-PA.

Chou, S. I., Bae, J. H. 1988. Phase-Behavior Correlation for High-Salinity Surfactant Formulations. SPE Reservoir Engineering, 3 (3), 778-90. https://doi.org/10.2118/14913-PA.

Han, M., AlSofi, A., Fuseni, A. et al. 2013. Development of Chemical EOR Formula- tions for a High Temperature and High Salinity Carbonate Reservoir. Presented at the International Petroleum Technology Conference, Beijing, China, 26-28 March. https://doi.org/10.2523/IPTC-17084-MS.

Ghosh B. and Obassi, D. 2013. Eco-Friendly Surfactant for EOR in High Temperature, High Salinity Carbonate Reservoir. Presented at the SPE Enhanced Oil Recovery Conference, Kuala Lumpur, Malaysia, 2-4 July. https://doi.org/10.2118/165219-MS.

Jabbar, M. Y., Sowaidi, A. A., Obeidli, A. A. et al. 2017. Chemical Formulation Design in High Salinity, High Temperature Carbonate Reservoir for a Super Giant Offshore Field in Middle East. Presented at the Abu Dhabi International Petroleum Exhibition & Conference, Abu Dhabi, UAE, 13-16 November. https://doi.org/10.2118/188604-MS.

What is claimed is:

1. A surfactant formulation for use in chemical enhanced oil recovery, wherein said surfactant formulation comprises at least:
    i) an anionic salt of an alkyl alkoxylated sulfate, wherein said alkyl alkoxylated sulfate has a molecular structure as shown in [I]:

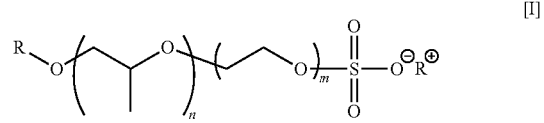

[I]

wherein
R is a linear, branched or mixture of linear and branched alkyl group having from 10 to 20 carbon atoms,
n=4-15,
m=0-10,
$M^+$ is an alkali metal ion, an alkanolamine ion, an alkyl amine ion or an ammonium ion; and
ii) a non-ionic alcohol ethoxylate, wherein said alcohol ethoxylate has a molecular structure as shown in [II]:

[II]

wherein
R1 is a linear, branched or mixture of linear and branched alkyl group having from 8 to 24 carbon atoms,
y=20-100.

2. The surfactant formulation of claim 1, wherein R is a branched alkyl group.

3. The surfactant formulation of claim 2, wherein R is a 2-alkyl branched group.

4. The surfactant formulation of claim 1, wherein m=0.

5. The surfactant formulation of claim 1, wherein R has from 12 to 16 carbon atoms.

6. The surfactant formulation of claim 1, wherein $R_1=C_{12}$-$C_{24}$.

7. The surfactant formulation of claim 1, wherein 40≤y 100.

8. The surfactant formulation of claim 1 wherein the weight ratio of i)/ii) is from 6:1 to 1:6.

9. The surfactant formulation of claim 1 wherein the combined concentration of i) and ii) does not exceed 0.5 weight % of the total formulation.

10. The surfactant formulation of claim 1 wherein said surfactant formulation lowers the interfacial tension of crude oil to ultralow values of at or below $10^{-1}$ mN/m.

11. The surfactant formulation of claim 1 above wherein said surfactant formulation is able to lower interfacial tension values of crude oil in brines with salinities from 4% up to 15% total dissolved solids.

12. A method for chemical enhanced oil recovery from a subterranean formation that is penetrated by at least one injection well and one production well, comprising:
   i) injecting into an injection well a surfactant formulation such that said surfactant formulation contacts crude oil present in said subterranean formation to lower the interfacial tension of said crude oil to ultralow values at or below $10^{-2}$ mN/m, said surfactant formulation being able to lower interfacial tension values in temperatures from 25° C. up to 70° C. and in brines with from 4% up to 15% total dissolved solids, at least a portion of said dissolved solids being divalent cations, said surfactant formulation comprising at least
      a) an anionic salt of an alkyl alkoxylated sulfate, wherein said alkyl alkoxylated sulfate has a molecular structure as shown in [I]:

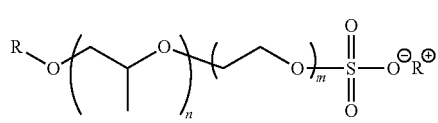

[I]

wherein
R is a linear, branched or mixture of linear and branched alkyl group having from 10 to 20 carbon atoms,
n=4-15,
m=0-10,
$M^+$ is an alkali metal ion, an alkanolamine ion, an alkyl amine ion or an ammonium ion; and b) a non-ionic alcohol ethoxylate, wherein said alcohol ethoxylate has a molecular structure as shown in [II]:

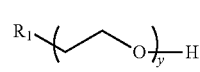

[II]

wherein
R1 is a linear, branched or mixture of linear and branched alkyl group having from 8 to 24 carbon atoms,
y=20-100,
recovering oil from the subterranean formation from a production well.

13. The method of claim 12, wherein R is a branched alkyl group.

14. The method of claim 12, wherein R is a 2-alkyl branched group.

15. The method of claim 12, wherein m=0.

16. The method of claim 12, wherein R has from 12 to 16 carbon atoms.

17. The method of claim 12, wherein $R_1=C_{12}-C_{24}$.

18. The method of claim 12, wherein $40<y\leq100$.

19. The method of claim 12, wherein the weight ratio of i)/ii) is from 6:1 to 1:6.

20. The method of claim 12, wherein the combined concentration of i) and ii) does not exceed 0.5 weight % of the total formulation.

21. The method of claim 12, wherein said surfactant formulation lowers the interfacial tension of crude oil to ultralow values of at or below $10^{-1}$ mN/m.

22. The method of claim 12, wherein said surfactant formulation is able to lower interfacial tension values of crude oil in brines with salinities from 4% up to 15% total dissolved solids.

* * * * *